Aug. 28, 1962  G. J. DEVERELL  3,051,005
AUTOMATIC OVER-SPEED AND UNDER-SPEED TRIP VALVES
Filed June 14, 1961
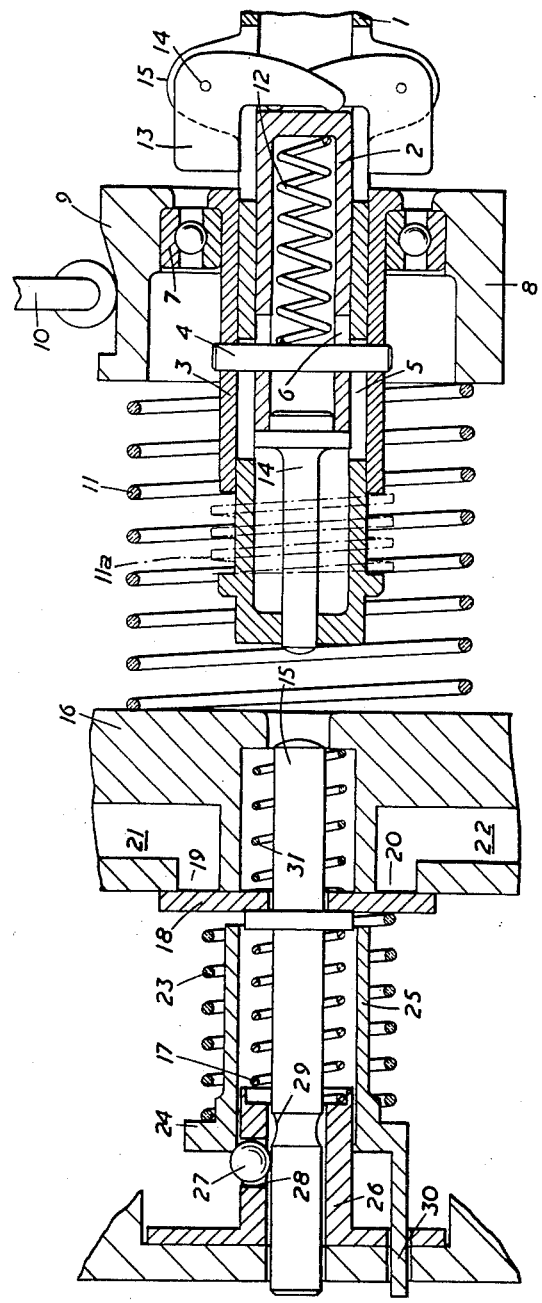

United States Patent Office 3,051,005
Patented Aug. 28, 1962

3,051,005
AUTOMATIC OVER-SPEED AND UNDER-SPEED
TRIP VALVES
Geoffrey John Deverell, Chigwell, England, assignor to
The Plessey Company Limited, London, England, a
British company
Filed June 14, 1961, Ser. No. 117,242
2 Claims. (Cl. 73—537)

This invention relates to automatic speed-trip devices and has for an object to provide an improved speed-responsive device which reversibly performs on operation, for example the closing of an electric switch, when a shaft reaches a predetermined first speed of rotation and performs another operation, for example the opening of an over-speed trip valve, when the shaft reaches a predetermined second higher speed, the last-mentioned operation being preferably non-reversible so that, once the said maximum speed has been exceeded and the operation been effected that operation will not become automatically reversed when thereafter the speed drops below the said maximum speed, so that the element operated, for example the trip valve, must be reset manually. The invention is particularly intended for, though not restricted in its application to, use in connection with a constant-speed drive in which the speed of an electric generator coupled to a variable-speed engine is maintained substantially constant by means of an air motor which is coupled by a differential gear drive to both the engine and the generator and arranged to be power-driven in one direction to supplement the engine-derived speed of the generator and to be allowed to rotate in the opposite direction so as to prevent a rise of the generator speed when the engine speed is high. In such an arrangement, the device according to the invention may be used to keep the generator disconnected from the load system when the generator speed is lower than a predetermined minimum speed somewhat below the desired constant speed, so that the generator is not connected to its load during starting of the engine until such speed is reached and is disconnected again when for any reason in operation the generator speed drops below the said minimum speed, and an automatic trip valve may be arranged to come into operation to arrest the air motor when for any reason the generator speed rises above a maximum speed which is slightly above the desired constant running speed of the generator, thus preventing damage when, for example, the engine runs at high speed after the air-motor control device has become locked in the position in which the air motor is power-driven to increase the generator speed.

It is an object of the present invention to provide an improved device of this character in which the further movement of the centrifugally actuated element when the shaft reaches the predetermined higher speed does not affect the position of the element operated at the first speed.

According to the present invention a centrifugally loaded element is arranged to act upon two series-connected springs of different pre-load so that the force of the element is transmitted to a less heavily pre-loaded first spring through a second spring, a stop being provided which limits the deformation of the less heavily pre-loaded first spring at a point at which its load is less than the pre-loading of the second spring, thus preventing, after completion of a first control operation at a first speed, further movement of the centrifugally loaded element until, when a predetermined higher second speed is reached, the second spring is deformed, an element interposed between the two springs being arranged to perform a first control operation when the predetermined minimum speed is reached, and means, operated by the centrifugally loaded element when moving beyond the point defined by the limitation of the deformation of the first spring, being arranged to perform a second control operation when the second speed is reached.

The accompanying drawing is a somewhat diagrammatical axial section illustrating an embodiment of the invention.

Referring now to the drawing, a shaft 1 is coupled in a suitable manner with the device of which the speed is to be supervised, for example with the generator of the constant speed drive described in my co-pending U.S. application Serial No. 38,671, filed June 24, 1960.

The shaft 1 contains in an axial bore a cup-shaped piston 2, and a bush 3, fitted over the shaft 1, is constrained to rotate with the shaft and limited in its longitudinal movement relative to the shaft by a cross-pin 4 which is secured in the bush 3 and which extends through two pairs of longitudinal slots 5 and 6 respectively provided in the shaft 1 and piston 2. Guided on the bush 3 by means of a shoulder-type ball bearing 7 is a switch-actuating member 8, which does not participate in the rotation of the shaft 1. The switch-actuating member 8 is urged by a spring 11 to the illustrated position, in which a cam surface 9, provided on the member 8 allows a cam follower 10 connected to the switch to assume its switch-open position, the force of the spring 11 being transmitted through the ball bearing to the bush 3, and thence through the cross-pin 4 and a second spring 12 of heavier initial load than the first spring 11 to the piston 2. The outward movement of the piston 2 is limited by a pair of L-shaped centrifugal weight elements 13 which are pivoted at 14 in lugs 15 of the shaft 1.

The initial load of the spring 11 is so determined that when the shaft rotates at the speed at which the load is desired to be switched on to the generator, the centrifugal action of the L-shaped members 13 upon the piston 2 is sufficient to overcome the loading of the first spring 11 and to shift the member 8 against the force of that spring with the cross-pin 4 held by the second spring 12 in contact with the ends of slots 6 of the piston 2, until the movement of the piston 2 is terminated by contact of the pin 4 with the cross-ends of the slots 5 of the shaft 1. During this axial movement the switch-actuating member 8 acts through its cam 9 upon the follower 10 to close a switch and thus put the generator on to load. If the generator speed subsequently falls again below the minimum permissible operating speed, the force of the spring 11 will return the switch-actuating member 8 to its original position, allowing the cam follower 10 to return the switch to its "off" position and the piston 2 to return to its illustrated position. If on the other hand the speed is maintained at or above the said minimum, minor variations of the speed below a predetermined maximum will not produce any further movement of the piston 2, since the pre-loading of the spring 12 is so heavy that the centrifugal force of the member 13 will only be sufficient to overcome the action of spring 12 when the maximum speed representing the safety cut-out limit is reached. When this is the case, the centrifugal action of the fly weights 13 will move the piston 2 further, compressing the second spring 12 to allow pin 4 to move along the slots 6 of the piston; a piston extension pin 14, which by the previous compression of spring 11 has been moved substantially into contact with a valve control pin 15 guided coaxially with the piston 2 in to the body 16 of the device, will then move the valve-control pin 15 axially against the action of a light spring 17 to open two air-vent ports 19 and 20.

The two air vent ports 19 and 20, which may be connected respectively to the two sides of a starting and locking valve as described in my co-pending U.S. application Serial No. 94,084, filed March 9, 1960, by two passages 21 and 22, which may be the passages having the same reference numbers in FIGURE 1 of the drawing accompanying the specification of the said co-pending application, are normally sealed by a valve plate 18 held on its seat by a spring 23 of adequate strength. The spring 23 is supported against a flange 24 of a locking bush 25 which is slidable on a sleeve-like portion 26 of the body 16 in which the rod 15 is guided. The bush 25 is normally prevented from being moved by the spring 23 beyond a predetermined position by a set of locking balls 27 which are each guided in a radial bore 28 of the sleeve portion 26 and normally prevented by the surface of the slidable rod member 15 from receding into this bore sufficiently to allow the bush 25 to pass. The rod member 15 has an annular recess 29 which is so arranged that when the piston 2 has been moved against the action of the spring 12, as far as the slots 6 will allow, the recessed groove 29 is aligned with the bores 28, thereby allowing the balls 27 to move out of the path of the bush 25, permitting the bush 25 to move away from the valve plate 18 sufficiently for the spring 23 to lose all its tension and for the valve plate 18, assisted by a light spring 31, to move clear of the apertures 19 and 20 and provide a free escape path for air from passages 21 and 22. During this movement the balls 27 act as anti-friction guide means for the axial movement of the bush 25.

When as a result of this the speed of the shaft 1 decreases again, the piston 2 will return to its original position, so that the pin 14 will disengage the pin 15. The latter however will not follow this movement, because the balls 27 are prevented by the locking bush 25 from moving outwardly and will therefore prevent the pin 15 from moving back to the illustrated position in which the groove 29 is out of alignment with the bore 28. For this reason the valve plate 18 will not close the ports 19 and 20 until the device is reset by means of an extension 30 of the bush 25. This extension 30 projects through the outer face of the body 16 and permits the bush 25 to be manually pushed inwardly under compression of the spring 23 until the balls 27 leave the bore of bush 25 and are thus free to move outwardly in their bores 28 under the action of the groove 29 as the pin 15 is moved to its original position by the spring 17. When this has taken place, the bush 24 is locked again by the balls 27 and the device is ready again to act as a safeguard against over-speeding of the shaft 1.

It is desirable that if the maximum speed is exceeded, the cut-out of the air motor should take place as rapidly as possible. This can be achieved by so designing the L-shaped centrifugal elements 13 that during the compression of the spring 12 under centrifugal action the rate of increase of the force exerted by the members 13 due to the outward-movement of their centre of gravity is greater than the rate of increase of the spring force due to compression of the spring 12, thus creating an unstable condition until the cross-pin 4 has reached the ends of the slots 6.

It will be appreciated that various details of the apparatus described may be modified within the scope of the invention. Thus the cam-and-roller action for actuating the switch may be replaced by a suitable linkage or toggle action, and instead of providing the extension 30 of the bush 25, a key-type resetting pin may be provided which must be inserted through a suitably shaped aperture in the outer surface of the body 16 to engage the flange 24 of the bush 25. Furthermore, to reduce the strain on the thrust bearing 7, the first spring 11 may be interposed between the bush 3 and an abutment on the shaft 1 as indicated in chain-dotted lines at 11a so as to rotate with the latter.

What I claim is:

1. A centrifugal switching device, comprising in combination a rotatable shaft, a centrifugal member mounted eccentrically on said shaft for rotation with it about the axis of the shaft and for movement relative to the shaft under centrifugal action, an actuator member operatively connected to said centrifugal member for movement in accordance with the movement of said centrifugal member under such centrifugal action, an abutment member movable with predetermined limits relative to said first actuator member in the direction of movement thereof, a preloaded first spring interposed between said actuator member and abutment member to normally maintain said abutment member at its end position determining the limit of the movement of the abutment member relative to the actuator member in the direction of the centrifugal movement of said actuator member, a first control element operatively connected to said abutment member, second spring means having a preload less than that of said first spring means acting upon said control element and abutment member in opposition to said first spring means so that initial movement of said actuator member under the action of centrifugal force will move said control element against the force of said second spring, stop means limiting the movement of said abutment member in the direction of such movement, a second control element movable by said actuator member under such centrifugal action, a preloaded third spring means acting on the second control element in opposition to such movement, and a further stop means limiting the movement of the second control element under the action of the third spring means to maintain the second control element spaced from said actuator member until the latter has moved the abutment member to its limit of movement and continues movement under deformation of said first spring.

2. Apparatus as claimed in claim 1, comprising manually releasable trip means co-operating with said second control element to prevent return movement thereof under the action of said third spring after the second control element has been moved a predetermined distance by said actuator member.

References Cited in the file of this patent
UNITED STATES PATENTS
2,991,655    Jorgensen _____ July 11, 1961